US011100161B2

(12) United States Patent
Diamond et al.

(10) Patent No.: US 11,100,161 B2
(45) Date of Patent: Aug. 24, 2021

(54) SYSTEMS AND METHODS FOR GENERATING AND MANAGING AUDIO CONTENT

(71) Applicant: Oath Inc., Dulles, VA (US)

(72) Inventors: Brandon T. Diamond, Great Neck, NY (US); Alexandra Berke, New York, NY (US); Ilana Sufrin, New York, NY (US); Robb Monn, Brooklyn, NY (US)

(73) Assignee: Verizon Media Inc., New York, NY (US)

( * ) Notice: Subject to any disclaimer, the term of this patent is extended or adjusted under 35 U.S.C. 154(b) by 393 days.

(21) Appl. No.: 14/512,334

(22) Filed: Oct. 10, 2014

(65) Prior Publication Data

US 2015/0106713 A1 Apr. 16, 2015

Related U.S. Application Data

(60) Provisional application No. 61/890,139, filed on Oct. 11, 2013.

(51) Int. Cl.
*G06F 16/60* (2019.01)
*G06F 3/0484* (2013.01)
(Continued)

(52) U.S. Cl.
CPC ............ *G06F 16/60* (2019.01); *G06F 3/0484* (2013.01); *G06F 16/40* (2019.01); *G06F 16/958* (2019.01); *G06F 16/972* (2019.01); *G10L 15/26* (2013.01); *H04L 65/60* (2013.01); *H04L 67/02* (2013.01); *H04M 3/42221* (2013.01);
(Continued)

(58) Field of Classification Search
CPC .............. G06F 17/30867; G06F 17/27; G06F 17/3074; G06F 17/30893; G06F 3/0484; G06F 17/3089; G06F 16/60; G06F 16/972; G06F 16/958; G06F 16/40; H04L 67/02; H04L 65/60; H04L 12/1813; H04L 51/02; H04L 65/607; H04M 3/42221;
(Continued)

(56) References Cited

U.S. PATENT DOCUMENTS 9,318,100 B2 * 4/2016 Bodin ................... G10L 13/00
2002/0053078 A1 * 5/2002 Holtz ................... G06Q 30/06
725/14

(Continued)

*Primary Examiner* — Nicholas Ulrich
(74) *Attorney, Agent, or Firm* — Bookoff McAndrews, PLLC

(57) ABSTRACT

Methods, systems, and computer-readable media are disclosed for generating and managing audio content, such as blogcast episodes. In accordance with one implementation, a computer-implemented method is provided that includes operations performed by at least one processor including retrieving a plurality of stored snippets of media content related to a blogcast episode, the plurality of stored snippets of media content including one or more snippets of user-contributed content. The method also includes receiving snippet metric data associated with one or more snippets of user-contributed content. In addition, the method includes selecting two or more snippets of the plurality of stored snippets of media content including at least one snippet of user-contributed content and generating a blogcast episode comprising the two or more snippets of the plurality of snippets of media content.

11 Claims, 5 Drawing Sheets

(51) Int. Cl.
*H04M 7/00* (2006.01)
*G06F 16/958* (2019.01)
*H04M 3/42* (2006.01)
*G06F 16/40* (2019.01)
*G10L 15/26* (2006.01)
*H04L 29/08* (2006.01)
*H04L 29/06* (2006.01)

(52) U.S. Cl.
CPC .... *H04M 7/0069* (2013.01); *H04M 2203/356* (2013.01); *H04M 2203/655* (2013.01)

(58) Field of Classification Search
CPC ......... H04M 7/0069; H04M 2203/655; H04M 2203/356; G06Q 30/0241; G10L 15/26; H04H 60/33
See application file for complete search history.

(56) References Cited

U.S. PATENT DOCUMENTS

| | | | | |
|---|---|---|---|---|
| 2002/0141491 A1* | 10/2002 | Corts | G06Q 30/0269 | 375/216 |
| 2005/0198193 A1* | 9/2005 | Halme | G06F 17/30784 | 709/217 |
| 2005/0257240 A1* | 11/2005 | Faulkner | G06F 17/30817 | 725/92 |
| 2006/0015904 A1* | 1/2006 | Marcus | G11B 27/034 | 725/46 |
| 2006/0190616 A1* | 8/2006 | Mayerhofer | H04L 67/20 | 709/231 |
| 2007/0078876 A1* | 4/2007 | Hayashi | G06F 17/30035 | |
| 2007/0118853 A1* | 5/2007 | Kreitzer | H04L 65/4084 | 725/46 |
| 2007/0226432 A1* | 9/2007 | Rix | G06F 17/30849 | 711/154 |
| 2007/0239883 A1* | 10/2007 | Glenn | G11B 27/034 | 709/231 |
| 2007/0288836 A1* | 12/2007 | Partovi | H04M 3/4938 | 715/202 |
| 2007/0300260 A1* | 12/2007 | Holm | H04N 5/4401 | 725/47 |
| 2008/0137831 A1* | 6/2008 | Khorsandi | H04M 3/56 | 379/202.01 |
| 2008/0155099 A1* | 6/2008 | Park | H04L 65/4084 | 709/225 |
| 2008/0255686 A1* | 10/2008 | Irvin | G06Q 30/02 | 700/94 |
| 2009/0094285 A1* | 4/2009 | Mackle | G06F 17/30017 | |
| 2009/0144060 A1* | 6/2009 | Groeger | G10L 13/00 | 704/260 |
| 2009/0204402 A1* | 8/2009 | Marwaha | G06Q 10/10 | 704/260 |
| 2012/0011227 A1* | 1/2012 | Jones | G06F 17/30899 | 709/219 |
| 2012/0040604 A1* | 2/2012 | Amidon | H04H 60/06 | 455/3.05 |
| 2012/0079017 A1* | 3/2012 | Ingrassia, Jr. | G06F 17/30029 | 709/204 |
| 2012/0110432 A1* | 5/2012 | Mei | G06F 17/248 | 715/233 |
| 2012/0179752 A1* | 7/2012 | Mosley | G06Q 10/10 | 709/204 |
| 2013/0033971 A1* | 2/2013 | Stier | H04N 21/25866 | 369/1 |
| 2013/0080159 A1* | 3/2013 | Sharifi | H04L 67/2804 | 704/231 |
| 2015/0205492 A1* | 7/2015 | Nobil | G06F 17/3005 | 715/716 |

* cited by examiner

Code to Embed Widget

```
<div id='blogcast-widget' class='5252d153bba197910000001'></div><script type='text/javascript' src='http://patronus-petri.dotcloud.com/js/widget.js'></script>
```
— 310

Widget Use Example

300

Participate in Wally C's blogcast

The blogcast will be on:    [DATE]    at    [TIME]

Fill out the below form if you would like to converse with Wally C regarding a question or comment relating to this article.

FIRST NAME: _____
LAST NAME: _____
PHONE NUMBER: _____
EMAIL ADDRESS: _____

Your question or comment for wally c:

[REGISTER] — 308

SYSTEMS AND METHODS FOR GENERATING AND MANAGING AUDIO CONTENT

CROSS-REFERENCE TO RELATED APPLICATION(S)

This application claims the benefit of U.S. Provisional Patent Application No. 61/890,139, filed on Oct. 11, 2013, the entire disclosure of which is expressly incorporated herein by reference to its entirety.

BACKGROUND

Technical Field

This disclosure generally relates to field of content management and the generation of digital content, such as audio clips and other types of media files. More particularly, and without limitation, the present disclosure relates to computerized systems and methods for capturing audio content and generating one or more blogcast episodes to deliver the captured audio content to users. The present disclosure also relates to computerized systems and methods for autonomously generating blogcast episodes from a variety of sources of media content.

Background

Blogcast ng generally refers to a process of distributing media files, such as audio programs or clips, to users over a medium or network such as the Internet. A blogcast may be streamed in real time or made available for downloading and playback on a user's device (e.g., a personal computer, a laptop, a mobile phone, a MP3 player, etc). For example, a blogcast may be a digital recording of a radio broadcast, a video feed or similar content (e.g., a news show, a call-in program, a lecture, an entertainment program, etc) that is made available on one or more websites for distribution to users. A user may listen to a blogcast via a device that includes a personal audio player or other type of playback device. Blogcasts may include content created by an individual or groups of individuals. Further, a blogcast may include one or more "episodes", each of which represent an audio or media file that is intended to be played back in a specific sequence.

Modern day communication entails interaction between multiple media platforms (such as television and radio transmissions) with social media content. Similarly, articles on websites may be embedded with audio or video content. Accordingly, utilizing articles and embedding snippets of media content and providing related blogcast episodes has become an important avenue for personal expression, with implications for social networking, political discourse, and the relatively inexpensive distribution of specialized content created by individuals or entities. However, standard methods of creating and accessing blogcasts have disadvantages that may limit the growth of this form of expression.

For example, to record a blogcast episode (i.e., to create the content that will be made publicly available), a user may conduct a broadcast and have user submissions and then choose the audio content to include in the blogcast episode. To create a blogcast highlighting the topic of discussion from all possible audio content requires significant user editing. What is desired is a computerized system, apparatus and method for compiling a blogcast episode that autonomously assembles relevant audio content to include within the blogcast episode.

SUMMARY

In accordance with embodiments of the present disclosure, computer-implemented methods are provided for generating a blogcast episode. The disclosed embodiments include, for example, a method that includes operations performed by one or more processors including providing a user-interface to solicit potential caller information and receiving information related to a potential caller that is provided as input via the user-interface. The method also includes presenting the information in a host user-interface and determining a selection to create an electronic communication connection with the potential caller. In addition, the method includes storing the electronic communication as a snippet of media content.

Other embodiments of the present disclosure relate to a method for compiling a blogcast episode. In accordance with certain embodiments, the method includes operations performed by one or more processors including retrieving a plurality of stored snippets of media content related to a blogcast episode, the plurality of stored snippets of media content including one or more snippets of user-contributed content. The method also includes receiving metric data associated with the one or more snippets of the user-contributed content and selecting two or more snippets of media content including at least one of the one or more snippets of the user-contributed content. In addition, the method includes generating a blogcast episode comprising the two or more snippets of the plurality of snippets of media content.

Other embodiments of the present disclosure relate to a system including one or more processors and a storage device. The storage device stores instructions which may be executed by the one or more processors. In an embodiment, the instructions configure the one or more processors to retrieve a plurality of stored snippets of media content related to a blogcast episode, the plurality of stored snippets of media content including one or ore snippets of user-contributed content. The one or more processors are further configured to receive metric data associated with the one or more snippets of the user-contributed content and select two or more snippets of media content including at least one of the one or more snippets of the user-contributed content. In addition, the one or more processors are further configured to generate a blogcast episode comprising the two or more snippets of the plurality of snippets of media content.

Additional embodiments and related features of the present disclosure are described herein. It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate several embodiments of the present disclosure and together with the description, serve to explain the principles of the disclosed embodiments.

FIG. 3 illustrates exemplary code and a user interface, consistent with embodiments of the present disclosure.

DETAILED DESCRIPTION OF EXEMPLARY EMBODIMENTS

Reference will now be made in detail to the present embodiments of the disclosure, certain examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Figure 1:
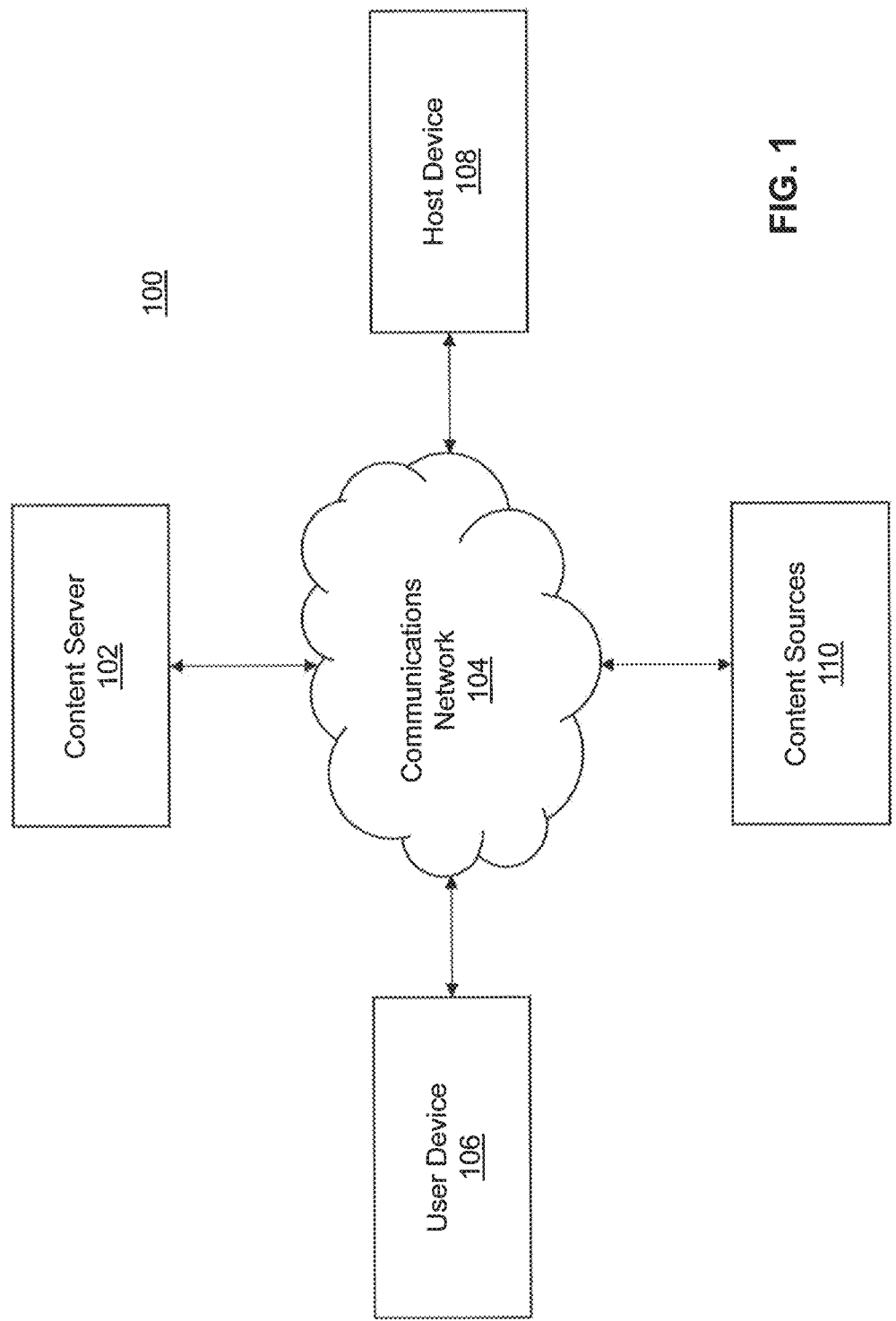
FIG. 1 illustrates an exemplary computing environment for implementing embodiments and features consistent with the present disclosure.

FIG. 1 illustrates an exemplary computing environment 100 for implementing embodiments consistent with the present disclosure. The number and arrangement of components in FIG. 1 are merely exemplary. Computing environment 100 may be implemented with similar or different arrangements, and the number of components (102, 104, 106, 108, and 110) may be increased so as to provide, for example, multiple components of each type shown in FIG. 1.

The various components of computing environment 100 may include an assembly of hardware, software, and/or firmware, including a memory, a central processing unit ("CPU"), and/or a user interface. Memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, and/or mouse.

In computing environment 100, a content server 102 is provided that generates blogcast episodes to be streamed to or downloaded by various computing or mobile devices. Content server 102 may include one or more web servers hosting web pages or software applications that provide for generating a blogcast episode in addition to hosting interfaces for potential callers and hosts, consistent with the embodiments and features discussed in more detail below. Content server 102 may also include databases or memory devices (not shown) for storing snippets of media content and data associated with the stored snippets of media content. Content server 102 may also serve as the host server for a blogcast. In some embodiments, some or all of the functions of content server 102 may be carried out by one or more third-parties, such as commercial web hosting services, communications services, or storage services.

As further shown in FIG. 1, a communications network 104 may connect and communicate data by and between one or more content servers 102, one or more content sources 110, one or more user devices 106, and one or more host devices 108. Network 104 may include one or more types of networks, including wired and wireless networks. For example, communications network 104 may include one or more wide area networks (WANs), metropolitan area networks (MANs), local area networks (LANs), or any combination of these networks. Further, communications network 104 may include a combination of a variety of different network types, including Internet, Ethernet, twisted-pair, coaxial cable, fiber optic, public switched telephone network (PSTN), cellular, satellite, IEEE 802.11, terrestrial, and/or other types of network connections. In some embodiments, communications network 104 comprises the Internet.

The one or more user devices 106 and one or more host devices 108 may be implemented as client devices. Host device 108 refers to a client device being utilized by a host of a blogcast. User device 106 refers to a client device utilized by individuals, apart from the host, who may partake in a blogcast episode recording and/or access information related to a blogcast.

Each client device (106 and 108) may include a variety of different types of computing devices capable of communicating with each content server 102 over communications network 104. By way of example, these computing devices may include personal computers, laptops, personal digital assistants (PDA), telephones, MP3 players, televisions, set-top boxes, mobile phones, smart-phones, tablet computers, servers, and/or other types of computing devices.

Different types of users may use different types of client devices to communicate with each content server 102. For example, if user device 106 is utilized to access a graphical user interface, then the required functionality includes the ability to display the user interface (e.g., on a display screen) and enter information that a potential caller must provide to partake in a blogcast episode recording (e.g., via a user input, such a mouse, keyboard, or microphone). Alternatively, a user device 106 downloading a blogcast episode and playing it may not require such functionality, but provide other functionality (e.g., playback via a speaker).

Content sources 110 may be one or more sources for providing snippets of media content, including audio clips or content. Such sources may include reporters providing news, paid contributors, video sources, multimedia sources, etc. Content sources 110 may be acquired via communications network 104 through any combination of digital and/or analog transmission standards including, but not limited to, voice over Internet protocol (VoIP), public switched telephone network (PSTN), over-the-air television, cable television, FM radio, AM radio, or satellite radio. Content sources 110 may include content created and transmitted by host device 108 or user device 106.

Communications network 104 may provide for the exchange of data utilized in, for example, recording and generating the blogcast episodes, between content server 102 and the client devices (106 and 108) in FIG. 1.

In accordance with some embodiments, snippets of audio and/or other media content may be captured from various sources. For example, a radio show, a broadcast, or a recording session may be scheduled based on which a blogcast episode will be generated. The blogcast episode recording may allow for opportunities for users or subscribers of a website to partake in the recording or to interact with the host(s) as the recording occurs. Accordingly, within a blogcast episode recording, audio content may be captured from a variety of sources (e.g., users, paid contributors, reporters, etc.) and channels (e.g., telephone, mobile phone, microphone, etc.). The captured audio content from the variety of sources may be autonomously and continuously integrated into topical audio programming, referred to herein as blogcast episodes. Accordingly, blogcast episodes may be autonomously compiled efficiently by dynamically arranging snippets of media content (e.g., audio files) based on user feedback and additional direct or indirect usage indicators related to the snippets of media content.

Figure 2:
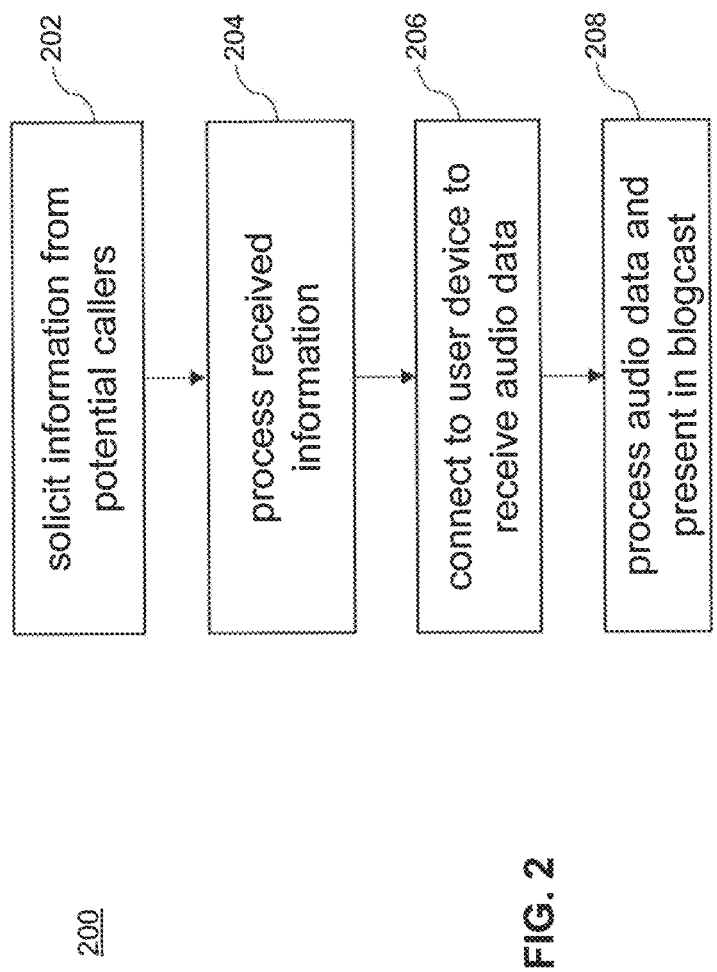
FIG. 2 is a flowchart of an exemplary method for generating a blogcast episode, consistent with embodiments of the present disclosure.

FIG. 2 illustrates an exemplary process 200 for generating blogcast episodes, consistent with disclosed embodiments. In some embodiments, process 200 may be performed by computing environment 100 and one or more processors. In step 202, computing environment 100 may solicit information from potential callers. For example, to initialize a blogcast episode recording, host device 108 may generate and transmit instructions over communications network 104 which provide information related to an upcoming blogcast episode recording. In some embodiments, host device 108 may post an article to a website which reveals information related to an upcoming recorded "question and answer" session with a particular host, personality, author or celebrity. The article may be hosted on content server 102 and made accessible to user device 106 over communications network 104. Along with the displayed identifying information, the website may include information prompting users accessing the website (i.e., callers) to provide contact information (e.g., a phone number and a written question). Such prompts may be displayed via a user interface of the website and/or implemented via one or more embeddable widgets or code on user device 106.

In some embodiments, host device 108 may access a host interface to generate the widgets or code to enable callers to participate in a blogcast. The host interface may receive instructions from host device 108 designating information identifying the blogcast and also designating which information to solicit from user device 106. In response, the widgets or code may be generated and provided to host device 108. The generated widgets or code may then be inserted into a website, a mobile application, or other electronic media accessible to potential callers so that the user interface may be generated. In some embodiments, the code may be generated such that it can be inserted with other code to define a location within an article or web page where the widget will appear and can be accessed by the potential caller. Alternatively, the code may represent a standalone webpage or mobile app. FIG. 3 illustrates exemplary code in code section 310 which may be embedded to generate a user interface (e.g., interface 300).

FIG. 3 also illustrates an exemplary user interface 300, consistent with exemplary embodiments of the present disclosure. Specially, interface 300 may be computer-generated, for example at content server 102 or at user device 106, and displayed to a user of device 106. Interface 300 may be provided via any website, blog, or mobile application that may provide timing information regarding an upcoming blogcast episode recording based on which a blogcast episode will be generated. Interface 300 may be the primary information displayed, may be displayed within other content, or may be displayed in response to a selection of a link embedded within an article or online content dealing with a certain topic.

As shown in FIG. 3, interface 300 may include blogcast information section 302 that provides information associated with the blogcast episode recording. In this example, the scheduled date and time of the blogcast episode recording can be listed. However, additional information such as the identification of the hosts, guests, topics of discussion, and/or any other relevant may be provided.

Interface 300 may also include a callers section 304 and a question section 306. These sections may allow potential callers to indicate their interest in participating in the blogcast episode recording. Specifically, callers section 304 allows potential caller to provide contact information via user device 106. While only entries for names, phone numbers, and email addresses are illustrated in FIG. 3, additional information regarding the potential caller or participant may be solicited including, for example, user name(s) (e.g., a Skype name or online ID), demographic information, political affiliation, location, website address, etc. Questions section 306 allows potential callers to provide their questions and/or comments to a host of a blogcast episode recording. A potential caller may submit the information entered in callers section 304 and question section 306 by selecting register button 308. Upon receiving a selection of register button 308, user device 106 may transmit the provided information to content server 102 over communications network 104. Additional or alternative buttons may be provided in interface 300 to submit information entered within callers section 304 and question section 306.

Referring back to FIG. 2, in step 204, system 100 may process information received from user device 106. For example, in some embodiments, the information submitted in callers section 304 may be verified. Specifically, verification emails may be sent to the provided email address. Alternatively, computerized or human-initiated telephone calls may be conducted to verify phone numbers and user names. A combination of email address and phone number may be utilized as well, wherein a potential caller receives a verification call and must input a verification code that is provided to the potential caller via email.

In some embodiments, a human or automated screener may participate in evaluating possible callers, eliminating callers who do not meet a certain criteria. Alternatively, content server 102 may automatically screen potential callers based on information received from user device 106. In some embodiments, content server 102 may be configured to identify keywords which indicate that the information received from user device 106 relates to a particular topic and flag the information as relevant. Potential callers flagged as relevant may be retained for approval by host device 108. Alternatively, content server 102 may be configured to identify irrelevant information, offensive language, or attributes associated with spam. Such information may be flagged by content server 102 as potentially irrelevant or automatically deleted.

At step 206, system 100 may connect to user device 106 to receive audio data. In some embodiments, a host of the blogcast episode recording may review questions and engage specific callers via a user interface that is web-based and/or displayed on host device 108 (e.g., a personal computer, a laptop, a mobile phone, etc).

In some embodiments, during a blogcast episode recording, a host may utilize the inputted information to initiate a telephone call with potential callers. These calls may be saved as snippets of media content for a later compilation of a blogcast episode that users are able to download. Upon approving a caller, the host's browser may be linked to the caller's phone line and the caller will have an opportunity to converse with the host. Subsequently, the host may have the ability to approve or reject the segment and the segment's recording will be added to a program roster. The roster may be stored in a database or memory device (e.g., content server 102).

In some embodiments, host device 108 may be connected to a caller's phone line. This may be achieved, for example, by a connection via the PTSN or a combination of VoIP technology utilized by host device 108 and a conventional telephone line connection at content sources 110. In some embodiments, other methods of establishing an audio connection with callers may be used. For example, host device 108 may generate and transmit instructions over communications network 104 which initiate a call based on the host's PTSN phone number and the caller's PTSN phone number. The resulting call may also be connected to communications network 104 and recorded by content server 102.

Further, a caller's phone line may instead be a VoIP connection. For example, as noted above, callers section 304 may collect username information from potential callers. This information may be used to initiate VoIP connection between the host and a potential caller. Such a connection may utilize a microphone and speakers either integrated or external (e.g., a webcam and external speakers) to user device 106 and may connect the caller, via communications network 104, to host device 108 or to a call based on the host's PTSN phone number.

In other embodiments, a caller may be connected to a host via the embedded widget itself. For example, interface 300 may detect a potential caller's IP address and establish a connection to collect audio and/or video based on the detected information. In such embodiments, audio and video information may be collected by a microphone or webcam integrated in or external to user device 106. Additionally, interface 300 may include additional elements allow user device 106 to control initiating or ending the connection.

In another embodiment, a user may provide user-contributed content by calling in via a recorded and live-streamed "party line" during a blogcast episode recording.

In some embodiments, tools may be provided via host device 108 for reviewing and screening captured audio commentary. The best or most popular audio comments may be collected for subsequent use.

In some embodiments, professional voice talent, writers, or users may record content collected from various sources to create snippets of media content. Such sources may include websites and news sources. Alternatively, written content may be synthesized into an audio files utilized one of numerous tools available. This media content (e.g., audio file) is collected for subsequent use.

Figure 4:
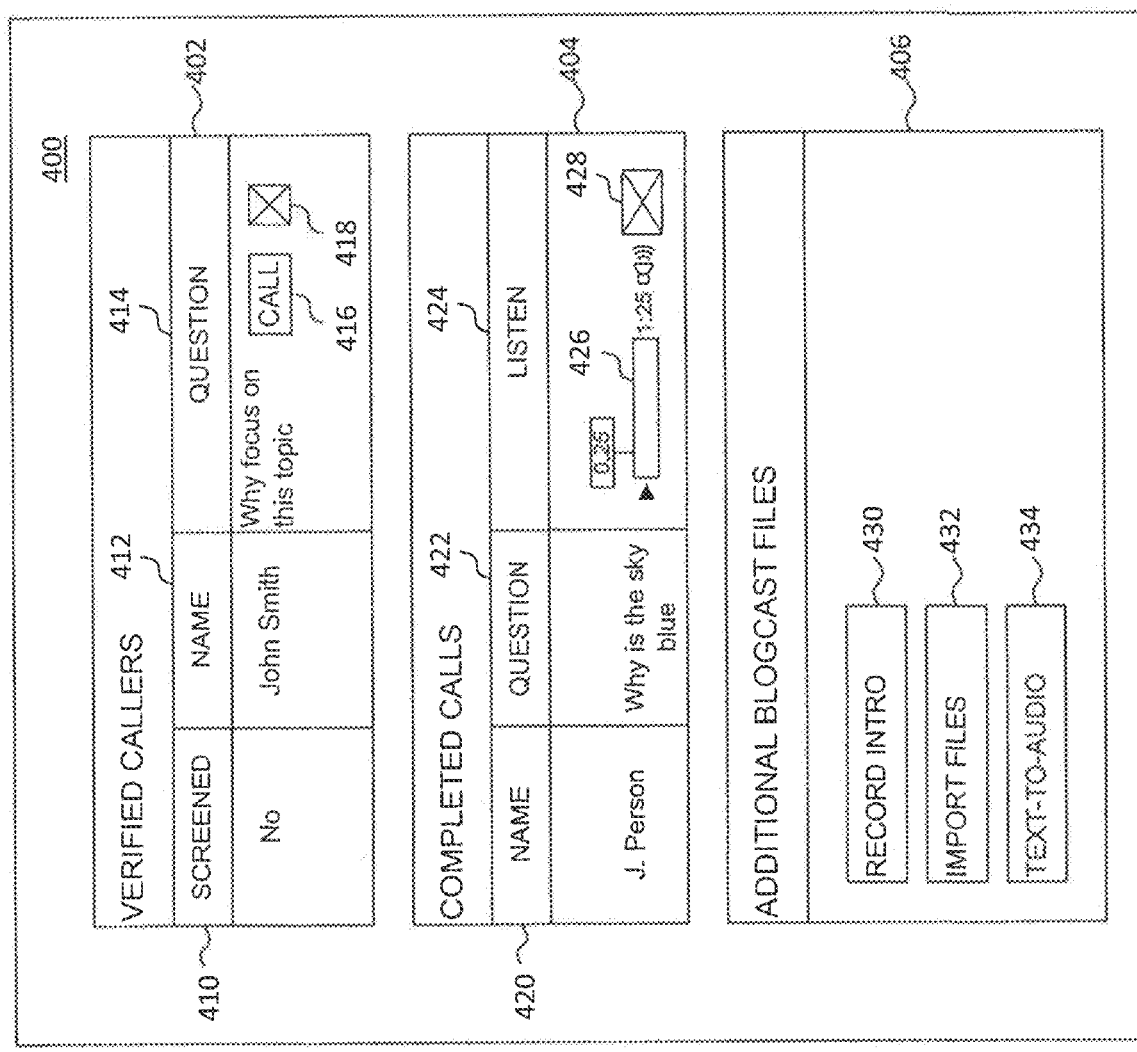
FIG. 4 illustrates another exemplary user interface, consistent with embodiments of the present disclosure.

Ultimately, selected snippets of media content may be appended together to form one singular sound file or blogcast episode. FIG. 4 illustrates another exemplary user interface 400 that may be displayed to a host of a broadcast or audio recording, consistent with embodiments of the present disclosure. Interface 400 may be computer-generated, for example at content server 102 or at host device 108, and displayed at host device 108 via a website, blog, or mobile application. As shown in FIG. 4, interface 400 may include a verified callers section 402, a completed calls section 404, and an additional blogcast files section 406. These sections are described below.

Verified callers section 402 displays information related to potential callers. For example, verified callers section 402 may display information based on information inputted by a potential caller in interface 300. Accordingly, once the information related to a potential caller is verified as discussed above, it may be included in verified callers section 402. In the example, verified callers section 402 includes three sections displaying screened status 410, name section 412, and question section 414. Screen status 410 may display that a particular potential caller has been screened by one of various mechanisms. The screening status may be based on a previous interaction with a potential caller, a human call made to the potential caller, a review of the question entered by the potential caller by a screener, or any other method.

The name section 412 provides the name of potential callers provided in callers section 304 and question section 414 provides corresponding questions or comments entered by potential callers in question section 306. A host may then call a potential caller during a broadcast based on the topic of their question or comment by selecting the corresponding call button 416. Upon selection of call button 416, host device 108 may establish a connection to one or more of content sources 110, during which time audio data of a conversation between the host and the caller may be collected and saved at content server 102. Alternatively, if a potential caller's question or comment is off-topic, information related to the potential caller may be discarded by selecting the delete button 418.

Completed calls section 404 includes information regarding previously completed calls with callers. The audio data or media files corresponding to these calls may provide snippets from user-contributed content. Within completed calls section 404, name section 420 provides the name of an actual caller and question section 422 provides the corresponding question or comment entered by the actual caller in question section 306. The user-contributed content 426 may be embedded within listening section 424. For example, user-contributed content 426 may be a snippet of media content such as the call conducted during the broadcast between the host and a caller. The embedded user-contributed content 426 may be playable by the host for review. Additionally, delete button 428 may be selected to delete any data stored related to a particular call.

In an embodiment, the user-contributed content 426 may be embedded with an article or page of a website (accessible via the Internet and/or other network) which is related to the blogcast episode. Accordingly, users accessing such an article or page of a website may be able to provide feedback regarding any particular snippet of media content such as segment voting ("liking"), sharing, providing positive and negative feedback, or commenting on it. Metrics related to such feedback, in addition to playing of such snippets, etc, may be stored by content server 102 and subsequently utilized for determining the most desired snippets for generating a blogcast episode.

Referring again to the example of FIG. 4, additional blogcast files section 406 may provide additional options to a host to generate snippets of media content that may be utilized in generating a blogcast episode. For example, a host may record an introduction to a blogcast episode by selecting record intro button 430. In some embodiments, a host may choose a specific recorded introduction out of multiple introductions stored either at host device 108 or content server 102 to be utilized in a blogcast episode. Additionally, import files button 432 may allow pre-stored snippets of media content, such as audio or video files to be imported into the host interface 400. These snippets of media content may include jingles, advertisements, and/or any other snippets of audio or media content that are to be incorporated into the blogcast. Text-to-audio button 434 may allow a user to synthesize written data or text files into audio content in form of snippets of media content.

Figure 5:
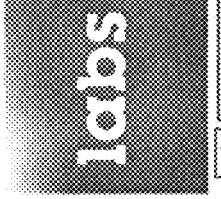
FIG. 5 illustrates another exemplary user interface, consistent with embodiments of the present disclosure.

Referring back to FIG. 2, in step 208, system 100 may process audio data and present the data in a blogcast. FIG. 5 illustrates another exemplary user interface 500, consistent with embodiments of the present disclosure. Interface 500 may be computer-generated, for example at content server 102 or at host device 108, and displayed at host device 108 via a website, blog, or mobile application. Interface 500 may be utilized via host device 108 by a host of a blogcast episode recording to edit content of the blogcast episode.

As shown in the example of FIG. 5, interface 500 includes a widget modification section 502. Widget modification section 502 may allow the host to modify properties of a widget associated with a blogcast episode (e.g., a widget implementing interface 300). For example, widget width, widget height, playlist title, playlist description, etc. Section 504 provides the code to embed a generated widget. For example, as described above with reference to FIG. 3, the widget or interface may be embedded in a website, mobile application, or other electronic media. Section 506 provides a preview of a generated widget including the plurality of snippets of media content that may be included in a blogcast episode.

In exemplary embodiments, a blogcast episode may be compiled together based on a host selecting a few snippets of content from all snippets of media content that may be incorporated into the blogcast episode including one or more snippets of user-contributed content. As described above, these snippets of media content may include recordings of the host, recordings of any calls, advertisements, jingles, and introductions. Additionally, or alternatively, the selection may be based on snippet metrics associated with snippets of user-contributed content. Snippet metrics may include quantified data specifying interactions of readers visiting a website or utilizing a mobile application to access an article or page of a website with the embedded snippets of user-contributed content. The interactions may include the number of times a particular snippet is listened to, commented on, shared, and/or given positive or negative feedback by users. Additionally, the interactions may include positive or negative feedback given to user comments on the article or the embedded snippets. As described above, any text comments may be synthesized to generate audio files that may be incorporated within a blogcast episode.

Accordingly, computerized systems consistent with the present disclosure may select one or more of the plurality of snippets of media content to be included in a blogcast based at least in part on the snippet metrics. In some embodiments, the compilation parameters are based on at least one of snippet metrics and user selections associated with the at least one snippet from the user-contributed content. For example, as discussed above, metrics related to snippets of media content (e.g., audio files) of calls from various callers may be embedded within an article related to the blogcast. These metrics regarding interactions with the embedded snippets may be utilized in numerous ways. For example, compilation parameters may exist that if particular snippet has been interacted with (e.g., played, clicked, liked, shared, etc.) a threshold number of times, it will be included in the blogcast episode. Additionally, or alternatively, a threshold number of snippets with the most interactions may be chosen to be included in the blogcast episode.

Further, user-contributed content may be parsed to determine which snippets of media content to include in the blogcast episode. In some embodiments, user-contributed content may be analyzed to determine relevant content to associate with the user contributed content. For example, content server 102 may analyze audio files of user-contributed content by converting speech-to-text and saving a textual transcript to content server 102. The transcript may be compared with available advertisements to determine advertisements to include in the blogcast. Alternatively the transcript may be compared with web page content to determine relevant locations (e.g., web pages or online articles) to include a link promoting the blogcast. In some embodiments, relevant portions of an article may also be identified to insert a link to a particular blogcast or a link to a particular snippet of user-contributed content.

Upon receiving the necessary settings at host device 108, provided as input through interface 500, the content server 102 may generate a blogcast episode comprising multiple selected snippets of media content to form a singular media file, referred to as a blogcast episode. The blogcast episode may be stored in any suitable format, such as MP3 or .wav format.

In an embodiment, interface 500 may enable a host to set conditions that certain types of snippets of media content are always included in the compiled blogcast episode. For example, an introduction, host discussion, and advertisements may always be included. Additionally, a desired length of time of the blogcast episode or a desired number of individual snippets to include may be set via interface 500.

It will be appreciated that any suitable configuration of hardware, software, processors, and data storage devices may be selected to carry out the embodiments of this disclosure, including computing environment 100 and the components thereof. The software and hardware associated with computing environment 100 may be selected to enable quick response to various business needs, relatively fast prototyping, and delivery of high-quality solutions and results. An emphasis may be placed on achieving high performance through scaling on a distributed architecture. The selected software and hardware may be flexible, to allow for quick reconfiguration, repurposing, and prototyping for research purposes.

The data flows, processes, and features described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

Therefore, it is intended that the disclosed embodiments and examples be considered as exemplary only, with a true scope of the present disclosure being indicated by the following claims and their equivalents.

What is claimed is:

1. A method for compiling a media episode, the method comprising the following operations performed by one or more processors:
    receiving, by a host device, one or more snippets of media content related to a media episode, the one or more snippets of media content including user-contributed content, wherein the user-contributed content includes audio data from at least one of one or more sources and one or more channels, each of the one or more sources and the one or more channels corresponding with one or more users associated with the media episode;
    selecting, based on a set of compilation parameters associated with the one or more snippets of media content, a first snippet of media content and a second snippet of media content for inclusion in the media episode, wherein the set of compilation parameters includes a threshold number of user interactions with the user-contributed content;
    parsing the user-contributed content to identify one or more segments of audio data for speech-to-text conversion;
    converting the one or more of the identified segments of audio data to a textual transcript; and
    based on the set of compilation parameters and the textual transcript, generating the media episode for presentation on a user device, wherein the media episode includes the first snippet of media content and the second snippet of media content in a media file, and wherein the media file includes at least video data and is embedded within a web page.

2. The method of claim 1, wherein the user-contributed content additionally includes at least one of audio data of calls between a host and a participant associated with the media episode, comments written on an article associated with the media episode, and comments provided by a reader on a respective snippet from the media content that is embedded in a website.

3. The method of claim 1, wherein the set of compilation parameters include data quantifying interactions with user-contributed content.

4. The method of claim 1, wherein the selecting, based on the set of compilation parameters associated with the one or more snippets of media content, further includes analyzing quantified data that specifies reader interactions with user-contributed content that is embedded in stored electronic web page content.

5. The method of claim 4, wherein user-contributed content which is subject to a greatest degree of reader interaction is selected.

6. The method of claim 1, wherein at least a subset of the user-contributed content is converted from text to audio for inclusion in the media episode.

7. The method of claim 1, wherein a link corresponds to a specific snippet of user-contributed content within the media episode.

8. The method of claim 1, wherein the set of compilation parameters include at least one of a length of time of the media episode and a number of snippets to include in the media episode from the one or more snippets of media content including user-contributed content.

9. The method of claim 1, wherein the method further comprises selecting electronic targeted content to include in the media episode based on an analysis of the textual transcript.

10. A system for generating a media episode, the system comprising:
    a memory device that stores instructions; and
    one or more processors that execute the instructions to perform a series of steps, including:
    receiving, by a host device, one or more snippets of media content related to a media episode, the one or more snippets of media content including user-contributed content, wherein the user-contributed content includes audio data from at least one of one or more sources and one or more channels, each of the one or more sources and the one or more channels corresponding with one or more users associated with the media episode;
    selecting, based on a set of compilation parameters associated with the one or more snippets of media content, a first snippet of media content and a second snippet of media content for inclusion in the media episode, wherein the set of compilation parameters includes a threshold number of user interactions with the user-contributed content;
    parsing the user-contributed content to identify one or more segments of audio data for speech-to-text conversion;
    converting the one or more of the identified segments of audio data to a textual transcript; and
    based on the set of compilation parameters and the textual transcript, generating the media episode for presentation on a user device, wherein the media episode includes the first snippet of media content and the second snippet of media content in a media file, and wherein the media file includes at least video data and is embedded within a web page.

11. A non-transitory computer-readable medium storing instructions that, when executed by at least one processor, cause the at least one processor to generate a media episode by performing operations comprising:
    receiving, by a host device, one or more snippets of media content related to a media episode, the one or more snippets of media content including user-contributed content, wherein the user-contributed content includes audio data from at least one of one or more sources and one or more channels, each of the one or more sources and the one or more channels corresponding with one or more users associated with the media episode;
    selecting, based on a set of compilation parameters associated with the one or more snippets of media content, a first snippet of media content and a second snippet of media content for inclusion in the media episode, wherein the set of compilation parameters includes a threshold number of user interactions with the user-contributed content;
    parsing the user-contributed content to identify one or more segments of audio data for speech-to-text conversion;
    converting the one or more of the identified segments of audio data to a textual transcript; and
    based on the set of compilation parameters and the textual transcript, generating the media episode for presentation on a user device, wherein the media episode includes the first snippet of media content and the second snippet of media content in a media file, and wherein the media file includes at least video data and is embedded within a web page.

* * * * *